(12) United States Patent
Way et al.

(10) Patent No.: US 10,159,969 B2
(45) Date of Patent: Dec. 25, 2018

(54) AMMONIA SYNTHESIS AT MODERATE CONDITIONS USING HYDROGEN PERMEABLE MEMBRANE REACTORS

(71) Applicants: James Douglas Way, Boulder, CO (US); Sean-Thomas Bourne Lundin, Golden, CO (US); Colin A. Wolden, Denver, CO (US)

(72) Inventors: James Douglas Way, Boulder, CO (US); Sean-Thomas Bourne Lundin, Golden, CO (US); Colin A. Wolden, Denver, CO (US)

(73) Assignee: Colorado School of Mines, Golden, CO (US)

( * ) Notice: Subject to any disclaimer, the term of this patent is extended or adjusted under 35 U.S.C. 154(b) by 132 days.

(21) Appl. No.: 15/087,169

(22) Filed: Mar. 31, 2016

(65) Prior Publication Data

US 2016/0288114 A1  Oct. 6, 2016

Related U.S. Application Data

(60) Provisional application No. 62/140,958, filed on Mar. 31, 2015.

(51) Int. Cl.
| | | |
|---|---|---|
| *B01J 35/06* | (2006.01) | |
| *C01C 1/04* | (2006.01) | |
| *B01J 23/648* | (2006.01) | |
| *B01J 23/50* | (2006.01) | |
| *B01J 37/02* | (2006.01) | |
| *B01D 69/14* | (2006.01) | |
| *B01J 37/34* | (2006.01) | |

(52) U.S. Cl.
CPC .......... *B01J 35/065* (2013.01); *B01D 69/145* (2013.01); *B01J 23/50* (2013.01); *B01J 23/6484* (2013.01); *B01J 37/0244* (2013.01); *C01C 1/0411* (2013.01); *B01D 2325/10* (2013.01); *B01J 37/0225* (2013.01); *B01J 37/0238* (2013.01); *B01J 37/34* (2013.01); *B01J 37/348* (2013.01); *Y02P 20/52* (2015.11)

(58) Field of Classification Search
None
See application file for complete search history.

(56) References Cited

U.S. PATENT DOCUMENTS

| | | | | |
|---|---|---|---|---|
| 3,653,831 | A * | 4/1972 | Burnett | B01J 23/8946 423/362 |
| 4,536,196 | A * | 8/1985 | Harris | B01D 53/22 423/650 |
| 5,738,708 | A * | 4/1998 | Peachey | B01D 53/228 427/250 |

(Continued)

OTHER PUBLICATIONS

Amar et al., "Solid-state electrochemical synthesis of ammonia: a review," J Sold State Electrochem, 2011, vol. 15, pp. 1845-1860.

(Continued)

*Primary Examiner* — Wayne A Langel
(74) *Attorney, Agent, or Firm* — Sheridan Ross P.C.

(57) ABSTRACT

The present invention relates to a method to synthesize ammonia at moderate conditions. The present invention also relates to a new chemical reactor configuration to achieve ammonia synthesis at moderate pressures and temperatures, and methods to make membranes for use in ammonia synthesis.

18 Claims, 5 Drawing Sheets

(56) References Cited

U.S. PATENT DOCUMENTS

| | | | | |
|---|---|---|---|---|
| 5,800,796 | A * | 9/1998 | Webb | B01J 31/10 423/584 |
| 6,152,987 | A * | 11/2000 | Ma | B01D 53/228 55/524 |
| 6,214,090 | B1 * | 4/2001 | Dye | B01D 53/228 55/524 |
| 6,267,801 | B1 * | 7/2001 | Baake | B01D 53/228 55/DIG. 5 |
| 6,492,290 | B1 * | 12/2002 | Dyer | B01D 69/141 252/519.1 |
| 7,163,670 | B2 * | 1/2007 | Ackerman | B01D 53/228 204/164 |
| 7,393,392 | B2 * | 7/2008 | Yamaguchi | B01D 53/228 427/585 |
| 7,862,643 | B2 * | 1/2011 | Aoyama | B01D 67/0072 423/648.1 |
| 7,947,116 | B2 * | 5/2011 | Mundschau | B01D 53/226 423/651 |
| 8,623,121 | B2 * | 1/2014 | Way | B01D 65/102 204/192.1 |
| 2003/0183080 | A1 * | 10/2003 | Mundschau | B01D 71/022 95/55 |
| 2004/0237779 | A1 * | 12/2004 | Ma | B01D 53/228 95/55 |
| 2006/0230937 | A1 * | 10/2006 | Smirnov | B01D 53/228 96/11 |
| 2007/0248874 | A1 * | 10/2007 | Aoyama | B01D 67/0072 429/411 |
| 2008/0168901 | A1 * | 7/2008 | Carolan | B01D 53/22 96/11 |
| 2008/0174040 | A1 * | 7/2008 | Saukaitis | B01D 53/228 264/48 |
| 2014/0021131 | A1 | 1/2014 | Fassbender | |
| 2014/0186253 | A1 * | 7/2014 | Kitagawa | C07C 65/03 423/362 |
| 2016/0193564 | A1 * | 7/2016 | Badwal | C01C 1/0411 423/362 |

OTHER PUBLICATIONS

Cooney et al., "A comparison of the performance and stabilit of Pd/BCC metal composite membranes for hydrogen purification," International Journal of Hydrogen Energy, 2014, vol. 39, pp. 19009-19007.

Ertl et al., "Interactions of nitrogen and hydrogen on iron surfaces," Applications of Surface Science, 1981; vol. 8(4), pp. 373-386—abstract only, 2 pages.

Ertl, "Primary steps in catalytic synthesis of ammonia," Journal of Vacuum Science & Technology A: Vacuum, Surfaces, and Films, 1983, vol. 1(2), pp, 1247-1253, abstract only, 1 page.

Fishel et al., "Ammonia Synthesis Catalyzed by Ruthenium Supported on Basic Zeolites," Journal of Catalysis, 1996, vol. 163(1), pp. 48-157, abstract only, 1 page.

Gade et al., "Dense Carbide/Metal Composite Membranes for Hydrogen Separations Without Platinum Group Metals," Advanced Materials, 2011, vol. 23(31), pp. 3585-3589.

Giamello, "Teaching an old material new tricks," Nature Chemistry, 2012, vol. 4, pp. 869-870.

Giddey et al., "Review of electrochemical ammonia production technologies and materials," International Journal of Hydrogen Energy, 2013, vol. 38(34), pp. 14576-14594, abstract only, 2 pages.

Honkala et al., "Ammonia Synthesis from First-Principles Calculations," Science, 2005, vol. 307(5709), pp. 555-558, abstract only, 1 page.

Kajiwara et al., "Hydrogen permeation properties through composite membranes of platinum supported on porous alumina," Catalysis Today, 2000, vol. 56(1/3), pp. 65-73.

Kojima et al., "Molybdenum nitride and carbide catalysts for ammonia synthesis," Applied Catalysis A: General, 2001, vol. 219(1-2), pp. 141-147.

Medford et al., "Assessing the reliability of calculated catalytic ammonia synthesis rates," Science, 2014, vol. 345(6193), pp. 197-200, abstract only, 1 page.

Morimoto et al., "Investigation of New Ammonia Synthesis Process Utilizing Vanadium-Based Hydrogen Permeable Alloy Membrane," Materials Transactions, 2016, vol. 57(3), pp. 423-427.

Nishimura et al., "V—Ni alloy membranes for hydrogen purification," Journal of Alloys and Compounds, 2002, vol. 330-332, pp. 902-906.

Steward, "Review of Hydrogen Isotope Permeabiolity Through Materials," Lawrence Livermore National Laboratory, Manuscript date: Aug. 15, 1983, 28 pages.

Suzuki et al., "Alloying Effects on Hydrogen Solubility and Hydrogen Permeability for V-Based Alloy Membranes," Materials Transactions, 2015, vol. 56(10), pp. 1688-1692.

Thornton, "Influence of apparatus geometry and deposition conditions on the structure and topology of thick sputtered coatings," Journal of Vacuum Science and Technology, 1974, vol. 11(4), pp. 666-670.

Zhang et al., "High-purity COx-free H2 generation from NH3 via the ultra permeable and highly selective Pd membranes," J Membr Sci, 2006, vol. 277 pp. 85-93.

* cited by examiner

AMMONIA SYNTHESIS AT MODERATE CONDITIONS USING HYDROGEN PERMEABLE MEMBRANE REACTORS

CROSS REFERENCE TO RELATED APPLICATIONS

This application claims priority and the benefit under 35 U.S.C. § 119(e) to U.S. Provisional Patent Application Ser. No. 62/140,958 filed Mar. 31, 2015, which is incorporated herein in its entirety by reference.

GOVERNMENT LICENSE RIGHTS

This invention was made with government support under grant number FastLane Proposal 1512172 awarded by the National Science Foundation (NSF). The Government has certain rights in the invention.

FIELD OF THE INVENTION

The present invention relates to a method to synthesize ammonia at moderate conditions. The present invention also relates to a membrane, which can be used to synthesize ammonia. The present invention also relates to a method of using a membrane to produce ammonia ($NH_3$) at moderate pressures (below about 10 atm) and temperatures that can be greater than about 350° C. (in some embodiments ≤about 400° C.).

BACKGROUND

Ammonia is a valuable commodity. It can be used in fertilization of crops, as a refrigerant, in the manufacturing of other materials, in cleaning solutions, and in other applications. Ammonia is also difficult to form. The elementary steps involved in ammonia synthesis were elucidated by Nobel-prize winner Gerhard Ertl and coworkers in *Primary steps in catalytic synthesis of ammonia*, Journal of Vacuum Science & Technology A, 1(2): p. 1247-1253 (1983). Ammonia synthesis requires a sufficient amount of energy to break the triple nitrogen-nitrogen bond to form atomic nitrogen and the hydrogen-hydrogen bond to form atomic hydrogen. The atomic nitrogen and atomic hydrogen must then react to form ammonia. Furthermore, the reaction equilibrium does not favor the formation of ammonia resulting in fewer ammonia molecules compared to the input of atomic hydrogen and atomic nitrogen. Thus, the reaction must occur at high temperature and pressure. The high temperature and pressure requires significant energy, accounting for between about 1 and 2% of the energy supply worldwide. Additionally, the conversion rate using conventional techniques is poor, typically between 10-15% per pass, which requires a majority of the gases to be recycled and additional power, pressure, and temperature sources to be consumed.

Commercial ammonia synthesis relies on the Haber-Bosch process, which uses a potassium-promoted iron catalyst in an energy intensive process that has remained largely unchanged for a hundred years. The equilibrium constant of this exothermic reaction becomes unfavorable above 200° C., but the catalyst requires temperatures of ~400° C. to have sufficient activity. To overcome these conflicting requirements, the process is conducted at extremely high pressure (greater than 200 atm) in multiple steps with interstage cooling to achieve sufficient conversion. Operating at such a high pressure and temperature increases the cost associated with the process. A long standing scientific challenge has been to achieve $NH_3$ synthesis at ambient pressure.

Electrochemical routes have been pursued to achieve $NH_3$ synthesis at ambient pressure. In electrochemical reactions, protons are driven by an applied voltage across an electrolyte where they recombine with $N_2$ and electrons at the cathode to produce ammonia. These electrochemical routes for $NH_3$ synthesis were reviewed by Giddey et al., *Review of electrochemical ammonia production technologies and materials*, International Journal of Hydrogen Energy, 38(34): p. 14576-14594 (2013)) who found them promising but current production rates are extremely low, with a maximum flux of $5 \cdot 10^{-4}$ mol/m$^2$s due to low conductivity (flux) of mixed salt/oxide electrolytes to hydrogen.

SUMMARY

The present invention provides a simpler, less expensive method to produce $NH_3$, one of the most important synthetic chemicals in the world due to its use in agriculture. The invention separates the production of atomic nitrogen and atomic hydrogen into separate reactions, then combines atomic hydrogen and atomic nitrogen to form the ammonia. By decoupling the reaction, atomic hydrogen and atomic nitrogen can be provided to the ammonia forming reaction in more efficient manner, allowing for a higher conversion rate to form the ammonia.

The potential productivity of a hydrogen permeable metal membrane reactor for $NH_3$ synthesis is quite high, given that the $H_2$ fluxes for either body center cubic (BCC) or palladium alloy membranes range from about 0.1-0.6 mol/m$^2$s, three orders of magnitude higher than the electrochemical process.

The chemisorption of $N_2$ is significantly slower than $H_2$ due to its stronger triple bond. To overcome this imbalance, a nitrogen separating material, such as a porous ruthenium layer, is used as a separation membrane layer. Advantageously, ruthenium is the least expensive of the Group VIII metals, with a price 10 times lower than palladium (~$70/troy ounce). This layer can be deposited by sputtering at room temperature, resulting in a porous, columnar structure as predicted by Thorton (*Influence of apparatus geometry and deposition conditions on the structure and topology of thick sputtered coatings*; J. Vac. Sci. Technol., 11(4): p. 666-670 (1974)). The structure of the ammonia synthesis catalyst material can provide extra sites to compensate for the relatively slow rate of $N_2$ chemisorption.

Previous work by the inventors using room temperature sputtering of palladium onto tubular supports produced a high flux, porous morphology analogous to the one can be used with the present invention. This palladium application method and resulting membrane are discussed in detail in U.S. Pat. No. 8,623,121 and U.S. Publication No. 2014-0251131, which are incorporated by reference in their entirety.

By way of non-limiting example only, a membrane reactor can be manufactured for $NH_3$ synthesis by combining a BCC or palladium alloy metal membrane with a porous ruthenium catalyst layer on the $NH_3$ synthesis side, fabricated by sputtering. The BCC metal membrane and its catalyst layer can be fabricated by sputtering, while a palladium or palladium alloy membrane can be fabricated by electrochemical techniques (electroless or electroplating) or sputtering.

Atomic hydrogen can permeate through the BCC metal membrane and then surface diffuse. Ammonia synthesis can occur on the porous ruthenium surface in a $N_2$ sweep stream.

Kajiwara and coworkers (*Hydrogen permeation properties through composite membranes of platinum supported on porous alumina*. Catalysis Today, 56 (1/3): p. 65-73 (2000)) have demonstrated surface diffusion of atomic hydrogen across high flux, porous platinum membranes where hydrogen solubility is extremely low.

An advantage of the invention is that the flux of atomic H and N may be independently controlled. The former can be controlled by the $H_2$ feed pressure and/or the permeability of the metallic membrane. The latter can be controlled by the $N_2$ pressure in the sweep stream. Note that sweep stream pressure this can be changed without impacting the driving force for $H_2$ permeation.

Throughout the disclosure, a material of the ammonia synthesis catalyst layer can be referred to as ruthenium, but it is understood that other materials can be used. Ruthenium has demonstrated ability and relatively modest cost. Other suitable materials include, but are not limited to, $Mo_2C$ coated BCC metals as the hydrogen permeable membrane. In this case, the $Mo_2C$ on the $N_2$ side will perform both $NH_3$ synthesis and $H_2$ dissociation functions. Kojima et al. (*Molybdenum nitride and carbide catalysts for ammonia synthesis*; Applied Catalysis A: General, 219(1-2): p. 141-147 (2001)) reported that $Mo_2C$ in the HCP phase is a very active and stable $NH_3$ synthesis catalyst, more than twice as active as promoted Fe. The HCP phase can be obtained when the $Mo_2C$ catalyst layers are sputtered at temperature between about 200° C. and about 400°, in some embodiments about 600° C.

An aspect of the invention is an ammonia forming membrane. The membrane includes at least one first catalyst layer, a BCC metal diffusion layer, at least one second catalyst layer, and an ammonia synthesis catalyst layer. The first catalyst layer is interconnected to the first side of the BCC metal diffusion layer and the second catalyst is interconnected to the second side of the BCC metal diffusion layer. The ammonia synthesis catalyst layer is interconnected to a second side of the second catalyst layer.

An aspect of the invention is an ammonia forming membrane. The membrane includes a doped BCC metal diffusion layer, first and second catalyst layers and an ammonia synthesis catalyst layer. The BCC layer includes a dopant. The catalyst layer is connected to the first side of the BCC metal diffusion layer, a second catalyst layer is on the second side of the BCC metal diffusion layer. The ammonia synthesis catalyst layer is connected to a second side of the second catalyst layer.

An aspect of the invention is a method of forming an ammonia forming membrane. The method includes providing a BCC metal diffusion layer, applying a first catalyst layer to the first side of the BCC metal diffusion layer, and applying an ammonia synthesis catalyst layer to the first catalyst layer.

An aspect of the invention is a method of using an ammonia forming membrane to form ammonia. The method includes providing hydrogen to a hydrogen separation side of the membrane to produce atomic hydrogen. The membrane includes a first catalyst layer, a BCC metal diffusion layer, a second catalyst layer, and an ammonia synthesis catalyst layer. The hydrogen separation side includes the first catalyst layer. Nitrogen is provided to the ammonia synthesis catalyst layer of the membrane to produce atomic nitrogen. The atomic hydrogen and the atomic nitrogen are combined to form ammonia.

These and other advantages will be apparent to one skilled in the art in view of this disclosure.

DETAILED DESCRIPTION

Figure 1:
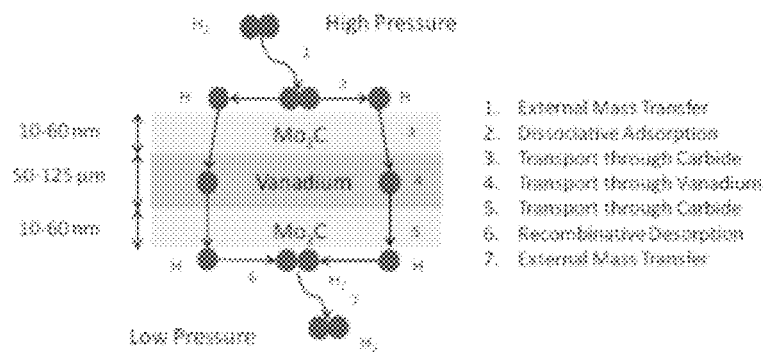
FIG. 1 illustrates the mechanism of $H_2$ transport through a catalyst layer (illustrated as $Mo_2C$), BCC metal diffusion layer (illustrated as vanadium)

The present invention relates to a method to form $NH_3$ by decoupling and independently controlling dissociative adsorption of $H_2$ and $N_2$, and controlling the conditions of the permeation and feed, respectively. The present invention also relates to a membrane for ammonia synthesis. The present invention also relates to a new chemical reactor configuration to achieve $NH_3$ synthesis at moderate pressures (below about 30 atm) and temperatures (greater than or equal to about 400° C.).

As used herein, "hydrogen" typically means a hydrogen gas of the formula $H_2$. One skilled in the art would understand that there can be different sources of hydrogen and that the present method can provide a starting material that can be reacted to form hydrogen, which can then be used in this process. Similarly, "nitrogen" typically means a nitrogen gas of the formula $N_2$. Nitrogen can be provided by processing a starting material to form nitrogen, which can then be supplied for use in the invention.

Suitable catalyst layer materials, for the first layer, second catalyst layers, catalyst layer or additional catalyst layer, methods of making the catalyst layers and methods of using the membranes formed with the catalyst and BCC metal diffusion layer can be found in U.S. Pat. No. 8,623,121, which issued on Jan. 7, 2014, and entitled "Stable Catalyst Layers for Hydrogen Permeable Composite Membranes," which is incorporated by reference in its entirety.

An aspect of the invention is an ammonia forming membrane. The membrane includes at least one first catalyst layer connected to a first side of a BCC metal diffusion layer. The membrane also includes at least one second catalyst layer which is connected on the second side to the BCC metal diffusion layer. The second catalyst layer is connected to at least one ammonia synthesis catalyst layer.

In certain embodiments of the present invention, the first catalyst layer and the second catalyst layer can be the same material. In some embodiments, the first layer and the second layer can be different materials. The materials for the first or second catalyst layer can be a platinum group metal, a platinum group alloy, a metal carbide, a metal sulfide, a metal nitride, a Group V metal, Group V metal alloy, a Group VI metal, a Group VI metal alloy, a Group VIII metal, a Group VIII metal alloy, and combinations thereof. By way of example only, the metal can be palladium, platinum, nickel, cobalt, ruthenium, iron, rhodium, manganese, chromium, molybdenum, tungsten, rhenium, tantalum, niobium, vanadium, zirconium, gold, copper, silver, alloys thereof, and the like. In some embodiments, the metal carbide can be chosen based on the operating temperature of the membrane. For example, if a higher temperature is desired in use, then the catalyst layer can be a metal carbide, such as molybdenum carbide. In some embodiments, a single first catalyst layer or second catalyst layer can be used. The thickness of a single first or second catalyst layer can be between about 2 nm and about 100 micrometers, in some embodiments about 5 to 100 nm. In some embodiments, multiple layers of the first catalyst layer or second catalyst layer can be used. The total thickness of the first catalyst layer and the second catalyst layer can be between about 2 nm and about 100 micrometers. In some embodiments, the layers of the first catalyst layer or the second catalyst layer can be made of the same material or can be different materials. The first or second catalyst layers can cover the entire first side or second side, respectively, of the BCC metal diffusion layer. In some embodiments, the first catalyst layer can cover between about 10% and about 100% of the BCC metal diffusion layer. In some embodiments, the second catalyst layer can cover between about 10% and about 100% of the BCC metal diffusion layer. The first catalyst layer or second catalyst layer can be any suitable shape. By way of example only, the first or second catalyst layer can be dots, squares, ovals, stars, diamonds, ovals, irregularly shaped, or any full cover the BCC metal diffusion layer.

The first catalyst layer and the second catalyst layer can react with a substantial amount of the hydrogen provided to it, and up to approximately 80%. The first and second catalyst layers of the present invention can be 100 times more permeable compared to proton conductor materials of the prior art, and should therefore be able to produce higher rates of hydrogen. A higher permeability can optimize the catalyst as the ammonia forming reaction will no longer be limited on how quickly protons can be supplied to atomic nitrogen to form ammonia. Furthermore, the first and second catalyst layers, along with the BCC metal diffusion layer, can be used to fine tune the hydrogen flux.

The BCC metal diffusion layer can be any suitable material, including Group V metals, or their alloys. The materials of the BCC metal diffusion layer are advantageous because, while hydrogen permeates the material, the materials do not dissociate hydrogen as easily as the materials of the first or second catalyst layers. The invention can take advantage of the permeation rate of hydrogen through the BCC metal diffusion layer to provide atomic hydrogen to the atomic nitrogen in a controlled manner. By way of non-limiting example, the material of the BCC metal diffusion layer can be vanadium, niobium, tantalum and alloys thereof. The thickness of the BCC metal diffusion layer can be between about 1 micron and about 1 mm. In some embodiments, the BCC metal diffusion layer can be doped with a doping material. The doping material can stabilize the BCC metal diffusion layer, often by reducing the hydrogen solubility, and is especially useful at lower temperature, below about 400° C. to prevent hydrogen embrittlement. The doping material can comprise iron, nickel, chromium, cobalt, molybdenum, tungsten, alloys thereof, and combinations thereof. Between about 1 wt. % and about 20 wt. % of the dopant to the total weight of the BCC metal diffusion layer material (BCC plus dopant) can be used. In some embodiments, the doping material can be iron in combination with another doping material. In some embodiments, iron is not used as the doping material. In some embodiments, nickel can be used as the doping material. Preferably, the BCC layer can be dense and essentially defect free.

The material of the ammonia synthesis catalyst layer can be ruthenium, iron, vanadium, palladium coated niobium, ruthenium coated palladium silver, titanium, zirconium, vanadium, niobium, hafnium, tantalum, chromium, molybdenum, tungsten, manganese, rhenium, technetium, alloys thereof, including by way of example vanadium-iron, and combinations thereof. The ammonia synthesis catalyst layer can disassociate nitrogen to atomic nitrogen in addition to forming ammonia. The ammonia synthesis catalyst layer can be porous. The total thickness of the ammonia synthesis catalyst layer can be between about 10 nm and about 500 microns. The ammonia synthesis catalyst layer can be a single layer of material, or can be multiple layers of material. Furthermore, multiple materials can be used in the ammonia synthesis catalyst layer. The ammonia synthesis catalyst layer can cover between about 1 to about 100% of the second catalyst layer. The ammonia synthesis catalyst layer can be any suitable shape. By way of example only, the ammonia synthesis catalyst layer can be dots, squares, ovals, stars, diamonds, ovals, irregularly shaped, or any full cover the second catalyst layer.

The membrane can further comprise a porous layer. The material of the porous layer can be alumina, silica, zirconia, ceria, titania and the like. Layers can be built to form the structure. By way of example only, ruthenium could be added to the porous material to prepare the ammonia synthesis catalyst layer. The second catalyst can then be deposited or added to the ammonia synthesis catalyst layer. A BCC metal, and the first catalyst layer can then be added to form the membrane. One skilled in the art would understand that you can alter the configuration of the membrane and its constituents without deviating from the invention.

The membrane can be any suitable shape or geometric configuration, including but not limited to tubular, planar, semi-tubular, oval, square, triangular, pyramid, non-planar, hollow fibers, or other shapes suitable for use in a particular process.

The ammonia synthesis catalyst layer can further include an ammonia promoter. Ammonia promoters can increase the ammonia synthesis rate. The ammonia promoter can include an alkali metal, including but not limited to potassium, cesium, or barium, or other similar materials. The ammonia promoter can be introduced using any suitable method, including impregnation of the material. For example, if the ammonia synthesis catalyst material is ruthenium, the promoter can be introduced by aqueous nitrate solutions of the alkali metal, including $CsNO_3$ or $BaNO_3$. The resulting molar ratios of the alkali metal to the material of the ammonia synthesis catalyst layer can be between about 1:1 and about 0.6:1. An aspect of the invention is an ammonia forming membrane. The membrane includes at least one first catalyst layer connected to a first side of a BCC metal diffusion layer. The membrane also includes at least one ammonia synthesis catalyst layer which is connected on its second side to the BCC metal diffusion layer.

The materials for the first catalyst layer can be a platinum group metal, a platinum group alloy, a metal carbide, a metal sulfide, a metal nitride, a Group V metal, Group V metal alloy, a Group VI metal, a Group VI metal alloy, a Group VIII metal, a Group VIII metal alloy, and combinations thereof. By way of example only, the metal can be palladium, platinum, nickel, cobalt, ruthenium, iron, rhodium, manganese, chromium, molybdenum, tungsten, rhenium, tantalum, niobium, vanadium, zirconium, gold, copper, silver, alloys thereof, and the like. In some embodiments, the metal carbide can be chosen based on the operating temperature of the membrane. For example, if a higher temperature is desired in use, then the catalyst layer can be a metal carbide, such as molybdenum carbide. In some embodiments, a single first catalyst layer can be used. The thickness of a single first catalyst layer can be between about 2 nm and about 100 micrometers, in some embodiments about 5 to 100 nm. In some embodiments, multiple layers of the first catalyst layer catalyst layer can be used. The total thickness of the first catalyst layer can be between about 2 nm and about 100 micrometers. In some embodiments, the layers of the first catalyst layer can be made of the same material or can be different materials. The first catalyst layer can cover the entire first side of the BCC metal diffusion layer. In some embodiments, the first catalyst layer can cover between about 10% to about 100% of the BCC metal diffusion layer. The first catalyst layer can be any suitable shape. By way of example only, the first catalyst layer can be dots, squares, ovals, stars, diamonds, ovals, irregularly shaped, or any full cover the BCC metal diffusion layer.

The first catalyst layer can react with a substantial amount of the hydrogen provided to it, and up to approximately 80%. The first catalyst layer of the present invention can be 100 times more permeable compared to proton conductor materials of the prior art, and should therefore be able to produce higher rates of hydrogen. A higher permeability can optimize the catalyst as the ammonia forming reaction will no longer be limited on how quickly protons can be supplied to atomic nitrogen to form ammonia. Furthermore, the first catalyst layer, along with the BCC metal diffusion layer, can be used to fine tune the hydrogen flux.

The BCC metal diffusion layer can be any suitable material, including Group V metals, or their alloys. The materials of the BCC metal diffusion layer are advantageous because, while hydrogen permeates the material, the materials do not dissociate hydrogen as easily as the materials of the first or second catalyst layers. The invention can take advantage of the permeation rate of hydrogen through the BCC metal diffusion layer to provide atomic hydrogen to the atomic nitrogen in a controlled manner. By way of non-limiting example, the material of the BCC metal diffusion layer can be vanadium, niobium, tantalum and alloys thereof. The thickness of the BCC metal diffusion layer can be between about 1 micron and about 1 mm. In some embodiments, the BCC metal diffusion layer can be doped with a doping material. The doping material can stabilize the BCC metal diffusion layer, often by reducing the hydrogen solubility, and is especially useful at lower temperature, below about 400° C. to prevent hydrogen embrittlement. The doping material can comprise iron, nickel, chromium, cobalt, molybdenum, tungsten, alloys thereof, and combinations thereof. Between about 1 wt. % and about 20 wt. % of the dopant to the total weight of the BCC metal diffusion layer material (BCC plus dopant) can be used. In some embodiments, the doping material can be iron in combination with another doping material. In some embodiments, iron is not used as the doping material. In some embodiments, nickel can be used as the doping material. Preferably, the BCC layer can be dense and essentially defect free.

The material of the ammonia synthesis catalyst layer can be ruthenium, iron, vanadium, palladium coated niobium, ruthenium coated palladium silver, titanium, zirconium, vanadium, niobium, hafnium, tantalum, chromium, molybdenum, tungsten, manganese, rhenium, technetium, alloys thereof, including by way of example vanadium-iron, and combinations thereof. The ammonia synthesis catalyst layer can disassociate nitrogen to atomic nitrogen in addition to forming ammonia. The ammonia synthesis catalyst layer can be porous. The total thickness of the ammonia synthesis catalyst layer can be between about 10 nm and about 500 microns. The ammonia synthesis catalyst layer can be a single layer of material, or can be multiple layers of material. Furthermore, multiple materials can be used in the ammonia synthesis catalyst layer. The ammonia synthesis catalyst layer can cover between about 1 to about 100% of the second catalyst layer. The ammonia synthesis catalyst layer can be any suitable shape. By way of example only, the ammonia synthesis catalyst layer can be dots, squares, ovals, stars, diamonds, ovals, irregularly shaped, or any full cover the second catalyst layer.

The membrane can further comprise a porous layer. The material of the porous layer can be alumina, silica, zirconia, ceria, titania and the like. Layers can be built to form the structure. By way of example only, ruthenium could be added to the porous material to prepare the ammonia synthesis catalyst layer. A BCC metal, and the first catalyst layer can then be added to form the membrane. One skilled in the art would understand that you can alter the configuration of the membrane and its constituents without deviating from the invention.

The membrane can be any suitable shape or geometric configuration, including but not limited to tubular, planar, semi-tubular, oval, square, triangular, pyramid, non-planar, hollow fibers, or other shapes suitable for use in a particular process.

The ammonia synthesis catalyst layer can further include an ammonia promoter. Ammonia promoters can increase the ammonia synthesis rate. The ammonia promoter can include an alkali metal, including but not limited to potassium, cesium, or barium, or other similar materials. The ammonia promoter can be introduced using any suitable method, including impregnation of the material. For example, if the ammonia synthesis catalyst material is ruthenium, the promoter can be introduced by aqueous nitrate solutions of the alkali metal, including $CsNO_3$ or $BaNO_3$. The resulting molar ratios of the alkali metal to the material of the ammonia synthesis catalyst layer can be between about 1:1 and about 0.6:1. An aspect of the invention is a membrane with an ammonia synthesis catalyst layer and a first catalyst layer. In some embodiments, the ammonia synthesis catalyst layer can be ruthenium and the first catalyst layer can be a palladium alloy metal membrane.

The materials for the first catalyst layer can be a platinum group metal, a platinum group alloy, a metal carbide, a metal sulfide, a metal nitride, a Group V metal, Group V metal alloy, a Group VI metal, a Group VI metal alloy, a Group VIII metal, a Group VIII metal alloy, and combinations thereof. By way of example only, the metal can be palladium, platinum, nickel, cobalt, ruthenium, iron, rhodium, manganese, chromium, molybdenum, tungsten, rhenium, tantalum, niobium, vanadium, zirconium, gold, copper, silver, alloys thereof, and the like. In some embodiments, the metal carbide can be chosen based on the operating temperature of the membrane. For example, if a higher temperature is desired in use, then the catalyst layer can be a metal carbide, such as molybdenum carbide. In some embodiments, a single first catalyst layer can be used. The thickness of a single first catalyst layer can be between about 2 nm and about 100 micrometers, in some embodiments about 5 and 100 nm. In some embodiments, multiple layers of the first catalyst layer catalyst layer can be used. The total thickness of the first catalyst layer can be between about 2 nm and about 100 micrometers. In some embodiments, the layers of the first catalyst layer can be made of the same material or can be different materials. The first catalyst layer can cover the entire first side of the ammonia synthesis layer. In some embodiments, the first catalyst layer can cover between about 10% to about 100% of the ammonia synthesis layer. The first catalyst layer can be any suitable shape. By way of example only, the first catalyst layer can be dots, squares, ovals, stars, diamonds, ovals, irregularly shaped, or any full cover the ammonia synthesis layer.

The first catalyst layer can react with a substantial amount of the hydrogen provided to it, up to approximately 80%. The first catalyst layer of the present invention can be 100 times more permeable compared to proton conductor materials of the prior art, and should therefore be able to produce higher rates of hydrogen. A higher permeability can optimize the catalyst as the ammonia forming reaction will no longer be limited on how quickly protons can be supplied to atomic nitrogen to form ammonia. Furthermore, the first catalyst layer can be used to fine tune the hydrogen flux.

The material of the ammonia synthesis catalyst layer can be ruthenium, iron, vanadium, palladium coated niobium, ruthenium coated palladium silver, titanium, zirconium, vanadium, niobium, hafnium, tantalum, chromium, molybdenum, tungsten, manganese, rhenium, technetium, alloys thereof, including by way of example vanadium-iron, and combinations thereof. The ammonia synthesis catalyst layer can disassociate nitrogen to atomic nitrogen in addition to forming ammonia. The ammonia synthesis catalyst layer can be porous. The total thickness of the ammonia synthesis catalyst layer can be between about 10 nm and about 500 microns. The ammonia synthesis catalyst layer can be a single layer of material, or can be multiple layers of material. Furthermore, multiple materials can be used in the ammonia synthesis catalyst layer. The ammonia synthesis catalyst layer can cover between about 1 to about 100% of the second catalyst layer. The ammonia synthesis catalyst layer can be any suitable shape. By way of example only, the ammonia synthesis catalyst layer can be dots, squares, ovals, stars, diamonds, ovals, irregularly shaped, or any full cover the second catalyst layer.

The membrane can be any suitable shape or geometric configuration, including but not limited to tubular, planar, semi-tubular, oval, square, triangular, pyramid, non-planar, hollow fibers, or other shapes suitable for use in a particular process.

The ammonia synthesis catalyst layer can further include an ammonia promoter. Ammonia promoters can increase the ammonia synthesis rate. The ammonia promoter can include an alkali metal, including but not limited to potassium, cesium, or barium, or other similar materials. The ammonia promoter can be introduced using any suitable method, including impregnation of the material. For example, if the ammonia synthesis catalyst material is ruthenium, the promoter can be introduced by aqueous nitrate solutions of the alkali metal, including $CsNO_3$ or $BaNO_3$. The resulting molar ratios of the alkali metal to the material of the ammonia synthesis catalyst layer can be between about 1:1 and about 0.6:1.

An aspect of the invention is an ammonia forming membrane. The membrane comprises a doped BCC metal diffusion layer. The BCC is doped with a doping material which is not iron. The membrane includes a catalyst layer which is connected to the second side of the BCC metal diffusion layer. The membrane also includes an ammonia synthesis catalyst layer, wherein the ammonia synthesis catalyst layer is connected to a second side of the catalyst layer.

The catalyst can also include an additional catalyst layer. The additional catalyst layer has a first side and a second side. The second side of the additional catalyst layer is connected to the first side of the BCC metal diffusion layer. Both the first and additional catalyst layers, along with the BCC metal diffusion layer, can be used to fine tune the hydrogen flux. Thus, it can be possible to have greater control of the process in use if the second catalyst layer is used.

In certain embodiments of the present invention, the catalyst layer and the additional catalyst layer can be the same material. In some embodiments, the catalyst layer and the additional catalyst layer can be different materials. The materials for the catalyst layer or additional catalyst layer can be a platinum group metal, a platinum group alloy, a metal carbide, a metal sulfide, a metal nitride, a Group V metal, Group V metal alloy, a Group VI metal, a Group VI metal alloy, a Group VIII metal, a Group VIII metal alloy, and combinations thereof. By way of example only, the metal can be palladium, platinum, nickel, cobalt, ruthenium, iron, rhodium, manganese, chromium, molybdenum, tungsten, rhenium, tantalum, niobium, vanadium, zirconium, gold, copper, silver, alloys thereof, and the like. In some embodiments, the metal carbide can be chosen based on the operating temperature of the membrane. For example, if a higher temperature is desired in use, then the catalyst layer (first or additional) can be a metal carbide, such as molybdenum carbide. In some embodiments, a single catalyst layer or additional catalyst layer can be used. The thickness of a single catalyst layer or additional catalyst layer can be between about 2 nm and about 100 micrometers, in some embodiments about 5 to 100 nm. In some embodiments, multiple layers of the catalyst layer or additional catalyst layer can be used. The total thickness of the catalyst layer and the additional catalyst layer can be between about 2 nm and about 100 micrometers. In some embodiments, the layers of the catalyst layer or the additional catalyst layer can be made of the same material or can be different materials. The catalyst layer or additional catalyst layer can cover the entire first side or second side, respectively, of the doped BCC metal diffusion layer. In some embodiments, the catalyst layer can cover between about 10% to about 100% of the doped BCC metal diffusion layer. In some embodiments, the additional catalyst layer can cover between about 10% to about 100% of the doped BCC metal diffusion layer. The catalyst layer or additional catalyst layer can be any suitable shape. By way of example only, the catalyst layer or additional catalyst layer can be dots, squares, ovals, stars, diamonds, ovals, irregularly shaped, or any full cover the doped BCC metal diffusion layer.

The catalyst layer and the additional catalyst layer can react with a substantial amount of the hydrogen provided to it, up to approximately 80%. The catalyst layer and additional catalyst layer of the present invention can be 100 times more permeable compared to proton conductor materials of the prior art, and should therefore be able to produce higher rates of hydrogen. A higher permeability can optimize the catalyst as the ammonia forming reaction will no longer be limited on how quickly protons can be supplied to atomic nitrogen to form ammonia. Furthermore, the catalyst layer and additional catalyst layer, along with the doped BCC metal diffusion layer, can be used to fine tune the hydrogen flux.

The doped BCC metal diffusion layer can be any suitable material, including Group V metals, or their alloys. The materials of the BCC metal diffusion layer are advantageous because, while hydrogen permeates the material, the materials do not dissociate hydrogen as easily as the materials of the first or second catalyst layers. The invention can take advantage of the permeation rate of hydrogen through the doped BCC metal diffusion layer to provide atomic hydrogen to the atomic nitrogen in a controlled manner. By way of non-limiting example, the material of the doped BCC metal diffusion layer can be vanadium, niobium, tantalum and alloys thereof. The thickness of the doped BCC metal diffusion layer can be between about 1 micron and about 1 mm.

The doping material can stabilize the BCC metal diffusion layer, often by reducing the hydrogen solubility, and is especially useful at lower temperature, below about 400° C. to prevent hydrogen embrittlement. The doping material can comprise iron, nickel, chromium, cobalt, molybdenum, tungsten, alloys thereof, and combinations thereof. Between about 1 wt. % and about 20 wt. % of the dopant to the total weight of the BCC metal diffusion layer material (BCC plus dopant) can be used. In some embodiments, the doping material can be iron in combination with another doping material. In some embodiments, iron is not used as the doping material. In some embodiments, nickel can be used as the doping material. Preferably, the BCC layer can be dense and essentially defect free.

The material of the ammonia synthesis catalyst layer can be ruthenium, iron, vanadium, palladium coated niobium, ruthenium coated palladium silver, titanium, zirconium, vanadium, niobium, hafnium, tantalum, chromium, molybdenum, tungsten, manganese, rhenium, technetium, alloys thereof, including by way of example vanadium-iron, and combinations thereof. The ammonia synthesis catalyst layer can disassociate nitrogen to atomic nitrogen in addition to forming ammonia. The ammonia synthesis catalyst layer can be porous. The total thickness of the ammonia synthesis catalyst layer can be between about 10 nm and about 500 microns. The ammonia synthesis catalyst layer can be a single layer of material, or can be multiple layers of material. Furthermore, multiple materials can be used in the ammonia synthesis catalyst layer. The ammonia synthesis catalyst layer can cover between about 1 to about 100% of the additional catalyst layer. The ammonia synthesis catalyst layer can be any suitable shape. By way of example only, the ammonia synthesis catalyst layer can be dots, squares, ovals, stars, diamonds, ovals, irregularly shaped, or any full cover the second catalyst layer.

The membrane can further comprise a porous layer. The material of the porous layer can be alumina, silica, zirconia, ceria, titania and the like. Layers can be built to form the structure. By way of example only, ruthenium could be added to the porous material to prepare the ammonia synthesis catalyst layer. The additional catalyst can then be deposited or added to the ammonia synthesis catalyst layer. A doped BCC metal, and the catalyst layer can then be added to form the membrane. One skilled in the art would understand that you can alter the configuration of the membrane and its constituents without deviating from the invention.

The membrane can be any suitable shape or geometric configuration, including but not limited to tubular, planar, semi-tubular, oval, square, triangular, pyramid, non-planar, hollow fibers, or other shapes suitable for use in a particular process.

The ammonia synthesis catalyst layer can further include an ammonia promoter. Ammonia promoters can increase the ammonia synthesis rate. The ammonia promoter can include an alkali metal, including but not limited to potassium, cesium, or barium, or other similar materials. The ammonia promoter can be introduced using any suitable method, including impregnation of the material. For example, if the ammonia synthesis catalyst material is ruthenium, the promoter can be introduced by aqueous nitrate solutions of the alkali metal, including $CsNO_3$ or $BaNO_3$. The resulting molar ratios of the alkali metal to the material of the ammonia synthesis catalyst layer can be between about 1:1 and about 0.6:1. An aspect of the invention is an ammonia forming membrane. The membrane comprises a BCC metal diffusion layer. The membrane includes a catalyst layer which is connected to the second side of the BCC metal diffusion layer. The membrane also includes an ammonia synthesis catalyst layer, wherein the ammonia synthesis catalyst layer is connected to a second side of the catalyst layer.

The catalyst can also include an additional catalyst layer. The additional catalyst layer has a first side and a second side. The second side of the additional catalyst layer is connected to the first side of the BCC metal diffusion layer. Both the first and additional catalyst layers, along with the BCC metal diffusion layer, can be used to fine tune the hydrogen flux. Thus, it can be possible to have greater control of the process in use if the second catalyst layer is used.

In certain embodiments of the present invention, the catalyst layer and the additional catalyst layer can be the same material. In some embodiments, the catalyst layer and the additional catalyst layer can be different materials. The materials for the catalyst layer or additional catalyst layer can be a platinum group metal, a platinum group alloy, a metal carbide, a metal sulfide, a metal nitride, a Group V metal, Group V metal alloy, a Group VI metal, a Group VI metal alloy, a Group VIII metal, a Group VIII metal alloy, and combinations thereof. By way of example only, the metal can be palladium, platinum, nickel, cobalt, ruthenium, iron, rhodium, manganese, chromium, molybdenum, tungsten, rhenium, tantalum, niobium, vanadium, zirconium, gold, copper, silver, alloys thereof, and the like. In some embodiments, the metal carbide can be chosen based on the operating temperature of the membrane. For example, if a higher temperature is desired in use, then the catalyst layer (first or additional) can be a metal carbide, such as molybdenum carbide. In some embodiments, a single catalyst layer or additional catalyst layer can be used. The thickness of a single catalyst layer or additional catalyst layer can be between about 2 nm and about 100 micrometers, in some embodiments about 5 to 100 nm. In some embodiments, multiple layers of the catalyst layer or additional catalyst layer can be used. The total thickness of the catalyst layer and the additional catalyst layer can be between about 2 nm and about 100 micrometers. In some embodiments, the layers of the catalyst layer or the additional catalyst layer can be made of the same material or can be different materials. The catalyst layer or additional catalyst layer can cover the entire first side or second side, respectively, of the BCC metal diffusion layer. In some embodiments, the catalyst layer can cover between about 10% to about 100% of the BCC metal diffusion layer. In some embodiments, the additional catalyst layer can cover between about 10% to about 100% of the BCC metal diffusion layer. The catalyst layer or additional catalyst layer can be any suitable shape. By way of example only, the catalyst layer or additional catalyst layer can be dots, squares, ovals, stars, diamonds, ovals, irregularly shaped, or any full cover the BCC metal diffusion layer.

The catalyst layer and the additional catalyst layer can react with a substantial amount of the hydrogen provided to it, up to approximately 80%. The catalyst layer and additional catalyst layer of the present invention can be 100 times more permeable compared to proton conductor materials of the prior art, and should therefore be able to produce higher rates of hydrogen. A higher permeability can optimize the catalyst as the ammonia forming reaction will no longer be limited on how quickly protons can be supplied to atomic nitrogen to form ammonia. Furthermore, the catalyst layer and additional catalyst layer, along with the doped BCC metal diffusion layer, can be used to fine tune the hydrogen flux.

The doped BCC metal diffusion layer can be any suitable material, including Group V metals, or their alloys. The materials of the BCC metal diffusion layer are advantageous because, while hydrogen permeates the material, the materials do not dissociate hydrogen as easily as the materials of the first or second catalyst layers. The invention can take advantage of the permeation rate of hydrogen through the BCC metal diffusion layer to provide atomic hydrogen to the atomic nitrogen in a controlled manner. By way of non-limiting example, the material of the BCC metal diffusion layer can be vanadium, niobium, tantalum and alloys thereof. The thickness of the BCC metal diffusion layer can be between about 1 micron and about 1 mm. In some embodiments, the BCC metal diffusion layer can be doped with a doping material. The doping material can stabilize the BCC metal diffusion layer, often by reducing the hydrogen solubility, and is especially useful at lower temperature, below about 400° C. to prevent hydrogen embrittlement. The doping material can comprise iron, nickel, chromium, cobalt, molybdenum, tungsten, alloys thereof, and combinations thereof. Between about 1 wt. % and about 20 wt. % of the dopant to the total weight of the BCC metal diffusion layer material (BCC plus dopant) can be used. In some embodiments, the doping material can be iron in combination with another doping material. In some embodiments, iron is not used as the doping material. In some embodiments, nickel can be used as the doping material. Preferably, the BCC layer can be dense and essentially defect free.

The material of the ammonia synthesis catalyst layer can be ruthenium, iron, vanadium, palladium coated niobium, ruthenium coated palladium silver, titanium, zirconium, vanadium, niobium, hafnium, tantalum, chromium, molybdenum, tungsten, manganese, rhenium, technetium, alloys thereof, including by way of example vanadium-iron, and combinations thereof. The ammonia synthesis catalyst layer can disassociate nitrogen to atomic nitrogen in addition to forming ammonia. The ammonia synthesis catalyst layer can be porous. The total thickness of the ammonia synthesis catalyst layer can be between about 10 nm and about 500 microns. The ammonia synthesis catalyst layer can be a single layer of material, or can be multiple layers of material. Furthermore, multiple materials can be used in the ammonia synthesis catalyst layer. The ammonia synthesis catalyst layer can cover between about 1 to about 100% of the additional catalyst layer. The ammonia synthesis catalyst layer can be any suitable shape. By way of example only, the ammonia synthesis catalyst layer can be dots, squares, ovals, stars, diamonds, ovals, irregularly shaped, or any full cover the second catalyst layer.

The membrane can further comprise a porous layer. The material of the porous layer can be alumina, silica, zirconia, ceria, titania and the like. Layers can be built to form the structure. By way of example only, ruthenium could be added to the porous material to prepare the ammonia synthesis catalyst layer. The additional catalyst can then be deposited or added to the ammonia synthesis catalyst layer. A BCC metal, and the catalyst layer can then be added to form the membrane. One skilled in the art would understand that you can alter the configuration of the membrane and its constituents without deviating from the invention.

The membrane can be any suitable shape or geometric configuration, including but not limited to tubular, planar, semi-tubular, oval, square, triangular, pyramid, non-planar, hollow fibers, or other shapes suitable for use in a particular process.

The ammonia synthesis catalyst layer can further include an ammonia promoter. Ammonia promoters can increase the ammonia synthesis rate. The ammonia promoter can include an alkali metal, including but not limited to potassium, cesium, or barium, or other similar materials. The ammonia promoter can be introduced using any suitable method, including impregnation of the material. For example, if the ammonia synthesis catalyst material is ruthenium, the promoter can be introduced by aqueous nitrate solutions of the alkali metal, including $CsNO_3$ or $BaNO_3$. The resulting molar ratios of the alkali metal to the material of the ammonia synthesis catalyst layer can be between about 1:1 and about 0.6:1.

An aspect of the invention is a method of forming an ammonia forming membrane. The method includes providing a BCC metal diffusion layer comprising a first side and a second side. A first catalyst layer is applied to the first side of the BCC metal diffusion layer and an ammonia synthesis catalyst layer applied to the first catalyst layer.

The first catalyst layer can be applied to the BCC metal diffusion layer. The method to apply the first catalyst layer can depend on the final thickness of the layer. In some embodiments, the first catalyst can be applied by sputtering, cold rolling, chemical vapor deposition, electrochemistry, electroless plating, and other suitable methods. The thickness of the first catalyst layer can be between about 2 nm to about 100 microns.

The ammonia forming membrane can comprise a second catalyst layer on the second side of the BCC metal diffusion layer. The second catalyst layer can be applied to the BCC metal layer using any of the methods used to apply the first catalyst layer.

In some embodiments, the BCC metal layer and the first catalyst layer can be prefabricated. The BCC metal layer, the first catalyst layer and the second catalyst layer can be prefabricated such that the method to form the ammonia membrane only requires adding the ammonia synthesis catalyst layer.

The ammonia synthesis catalyst layer can be applied by sputtering, chemical vapor deposition, electrochemistry, electroless plating, or other suitable methods. The thickness of the ammonia synthesis catalyst is between 10 nm and about 500 microns.

In certain embodiments of the present invention, the first catalyst layer and the second catalyst layer can be the same material. In some embodiments, the first layer and the second layer can be different materials. The materials for the first or second catalyst layer can be a platinum group metal, a platinum group alloy, a metal carbide, a metal sulfide, a metal nitride, a Group V metal, Group V metal alloy, a Group VI metal, a Group VI metal alloy, a Group VIII metal, a Group VIII metal alloy, and combinations thereof. By way of example only, the metal can be palladium, platinum, nickel, cobalt, ruthenium, iron, rhodium, manganese, chromium, molybdenum, tungsten, rhenium, tantalum, niobium, vanadium, zirconium, gold, copper, silver, alloys thereof, and the like. In some embodiments, the metal carbide can be chosen based on the operating temperature of the membrane. For example, if a higher temperature is desired in use, then the catalyst layer can be a metal carbide, such as molybdenum carbide. In some embodiments, a single first catalyst layer or second catalyst layer can be used. The thickness of a single first or second catalyst layer can be between about 2 nm and about 100 micrometers, in some embodiments about 5 to 100 nm. In some embodiments, multiple layers of the first catalyst layer or second catalyst layer can be used. The total thickness of the first catalyst layer and the second catalyst layer can be between about 2 nm and about 100 micrometers. In some embodiments, the layers of the first catalyst layer or the second catalyst layer can be made of the same material or can be different materials. The first or second catalyst layers can cover the entire first side or second side, respectively, of the BCC metal diffusion layer. In some embodiments, the first catalyst layer can cover between about 10% to about 100% of the BCC metal diffusion layer. In some embodiments, the second catalyst layer can cover between about 10% to about 100% of the BCC metal diffusion layer. The first catalyst layer or second catalyst layer can be any suitable shape. By way of example only, the first or second catalyst layer can be dots, squares, ovals, stars, diamonds, ovals, irregularly shaped, or any full cover the BCC metal diffusion layer.

The first catalyst layer and the second catalyst layer can react with a substantial amount of the hydrogen provided to it, up to approximately 80%. The first and second catalyst layers of the present invention can be 100 times more permeable compared to proton conductor materials of the prior art, and should therefore be able to produce higher rates of hydrogen. A higher permeability can optimize the catalyst as the ammonia forming reaction will no longer be limited on how quickly protons can be supplied to atomic nitrogen to form ammonia. Furthermore, the first and second catalyst layers, along with the BCC metal diffusion layer, can be used to fine tune the hydrogen flux.

The BCC metal diffusion layer can be any suitable material, including Group V metals, or their alloys. The materials of the BCC metal diffusion layer are advantageous because, while hydrogen permeates the material, the materials do not dissociate hydrogen as easily as the materials of the first or second catalyst layers. The invention can take advantage of the permeation rate of hydrogen through the BCC metal diffusion layer to provide atomic hydrogen to the atomic nitrogen in a controlled manner. By way of non-limiting example, the material of the BCC metal diffusion layer can be vanadium, niobium, tantalum and alloys thereof. The thickness of the BCC metal diffusion layer can be between about 1 micron and about 1 mm. In some embodiments, the BCC metal diffusion layer can be doped with a doping material. The doping material can stabilize the BCC metal diffusion layer, often by reducing the hydrogen solubility, and is especially useful at lower temperature, below about 400° C. to prevent hydrogen embrittlement. The doping material can comprise iron, nickel, chromium, cobalt, molybdenum, tungsten, alloys thereof, and combinations thereof. Between about 1 wt. % and about 20 wt. % of the dopant to the total weight of the BCC metal diffusion layer material (BCC plus dopant) can be used. In some embodiments, the doping material can be iron in combination with another doping material. In some embodiments, iron is not used as the doping material. In some embodiments, nickel can be used as the doping material. Preferably, the BCC layer can be dense and essentially defect free.

The material of the ammonia synthesis catalyst layer can be ruthenium, iron, vanadium, palladium coated niobium, ruthenium coated palladium silver, titanium, zirconium, vanadium, niobium, hafnium, tantalum, chromium, molybdenum, tungsten, manganese, rhenium, technetium, alloys thereof, including by way of example vanadium-iron, and combinations thereof. The ammonia synthesis catalyst layer can disassociate nitrogen to atomic nitrogen in addition to forming ammonia. The ammonia synthesis catalyst layer can be porous. The total thickness of the ammonia synthesis catalyst layer can be between about 10 nm and about 500 microns. The ammonia synthesis catalyst layer can be a single layer of material, or can be multiple layers of material. Furthermore, multiple materials can be used in the ammonia synthesis catalyst layer. The ammonia synthesis catalyst layer can cover between about 1 to about 100% of the second catalyst layer. The ammonia synthesis catalyst layer can be any suitable shape. By way of example only, the ammonia synthesis catalyst layer can be dots, squares, ovals, stars, diamonds, ovals, irregularly shaped, or any full cover the second catalyst layer.

The membrane can further comprise a porous layer. The material of the porous layer can be alumina, silica, zirconia, ceria, titania and the like. Layers can be built to form the structure. By way of example only, ruthenium could be added to the porous material to prepare the ammonia synthesis catalyst layer. The second catalyst can then be deposited or added to the ammonia synthesis catalyst layer. A BCC metal, and the first catalyst layer can then be added to form the membrane. One skilled in the art would understand that you can alter the configuration of the membrane and its constituents without deviating from the invention.

The membrane can be any suitable shape or geometric configuration, including but not limited to tubular, planar, semi-tubular, oval, square, triangular, pyramid, non-planar, hollow fibers, or other shapes suitable for use in a particular process.

The ammonia synthesis catalyst layer can further include an ammonia promoter. Ammonia promoters can increase the ammonia synthesis rate. The ammonia promoter can include an alkali metal, including but not limited to potassium, cesium, or barium, or other similar materials. The ammonia promoter can be introduced using any suitable method, including impregnation of the material. For example, if the ammonia synthesis catalyst material is ruthenium, the promoter can be introduced by aqueous nitrate solutions of the alkali metal, including $CsNO_3$ or $BaNO_3$. The resulting molar ratios of the alkali metal to the material of the ammonia synthesis catalyst layer can be between about 1:1 and about 0.6:1.

An aspect of the invention is a method of using an ammonia forming membrane. The method includes providing hydrogen to a hydrogen separation side of the membrane to produce atomic hydrogen. The membrane includes a first catalyst layer, a BCC metal diffusion layer, a second catalyst layer, and an ammonia synthesis catalyst layer. The hydrogen separation side includes the first catalyst layer. Nitrogen is provided to the ammonia synthesis catalyst layer of the membrane to produce atomic nitrogen. The atomic hydrogen and the atomic nitrogen are combined to form ammonia.

The membrane can be operated at a pressure between about 0.8 atm and about 30 atm, in some embodiments between about 1 atm and about 10 atm, and a temperature between about 300° C. and about 600° C., in some embodiments between about 350° C. to about 600° C. In some embodiments, the temperature was about 500° C. The flux of the atomic hydrogen through the BCC metal diffusion layer can be controlled using the material or thickness of the BCC metal diffusion layer. The rate at which the atomic hydrogen is provided to the ammonia synthesis catalyst side to form ammonia can also be controlled by the catalyst layer(s).

The flux of the hydrogen provided to the hydrogen separation side of the membrane can be between about 0.1 and about 1.0 mol/m$^2$s for a hydrogen feed pressure of about 32 psia=2.2 bar absolute. The hydrogen flux can be controlled by the hydrogen feed pressure and/or the permeability of the BCC properties and/or the catalyst layer properties. The nitrogen provided to the ammonia synthesis catalyst side of the membrane can be an excess. The overall conversion rate of the atomic hydrogen and atomic nitrogen to ammonia can be between about 1 and about 80%. The nitrogen flux can be controlled by the nitrogen pressure in the nitrogen gas stream.

In certain embodiments of the present invention, the first catalyst layer and the second catalyst layer can be the same material. In some embodiments, the first layer and the second layer can be different materials. The materials for the first or second catalyst layer can be a platinum group metal, a platinum group alloy, a metal carbide, a metal sulfide, a metal nitride, a Group V metal, Group V metal alloy, a Group VI metal, a Group VI metal alloy, a Group VIII metal, a Group VIII metal alloy, and combinations thereof. By way of example only, the metal can be palladium, platinum, nickel, cobalt, ruthenium, iron, rhodium, manganese, chromium, molybdenum, tungsten, rhenium, tantalum, niobium, vanadium, zirconium, gold, copper, silver, alloys thereof, and the like. In some embodiments, the metal carbide can be chosen based on the operating temperature of the membrane. For example, if a higher temperature is desired in use, then the catalyst layer can be a metal carbide, such as molybdenum carbide. In some embodiments, a single first catalyst layer or second catalyst layer can be used. The thickness of a single first or second catalyst layer can be between about 2 nm and about 100 micrometers, in some embodiments about 5 to 100 nm. In some embodiments, multiple layers of the first catalyst layer or second catalyst layer can be used. The total thickness of the first catalyst layer and the second catalyst layer can be between about 2 nm and about 100 micrometers. In some embodiments, the layers of the first catalyst layer or the second catalyst layer can be made of the same material or can be different materials. The first or second catalyst layers can cover the entire first side or second side, respectively, of the BCC metal diffusion layer. In some embodiments, the first catalyst layer can cover between about 10% to about 100% of the BCC metal diffusion layer. In some embodiments, the second catalyst layer can cover between about 10% to about 100% of the BCC metal diffusion layer. The first catalyst layer or second catalyst layer can be any suitable shape. By way of example only, the first or second catalyst layer can be dots, squares, ovals, stars, diamonds, ovals, irregularly shaped, or any full cover the BCC metal diffusion layer.

The first catalyst layer and the second catalyst layer can react with a substantial amount of the hydrogen provided to it, up to approximately 80%. The first and second catalyst layers of the present invention can be 100 times more permeable compared to proton conductor materials of the prior art, and should therefore be able to produce higher rates of hydrogen. A higher permeability can optimize the catalyst as the ammonia forming reaction will no longer be limited on how quickly protons can be supplied to atomic nitrogen to form ammonia. Furthermore, the first and second catalyst layers, along with the BCC metal diffusion layer, can be used to fine tune the hydrogen flux.

The BCC metal diffusion layer can be any suitable material, including Group V metals, or their alloys. The materials of the BCC metal diffusion layer are advantageous because, while hydrogen permeates the material, the materials do not dissociate hydrogen as easily as the materials of the first or second catalyst layers. The invention can take advantage of the permeation rate of hydrogen through the BCC metal diffusion layer to provide atomic hydrogen to the atomic nitrogen in a controlled manner. By way of non-limiting example, the material of the BCC metal diffusion layer can be vanadium, niobium, tantalum and alloys thereof. The thickness of the BCC metal diffusion layer can be between about 1 micron and about 1 mm. In some embodiments, the BCC metal diffusion layer can be doped with a doping material. The doping material can stabilize the BCC metal diffusion layer, often by reducing the hydrogen solubility, and is especially useful at lower temperature, below about 400° C. to prevent hydrogen embrittlement. The doping material can comprise iron, nickel, chromium, cobalt, molybdenum, tungsten, alloys thereof, and combinations thereof. Between about 1 wt. % and about 20 wt. % of the dopant to the total weight of the BCC metal diffusion layer material (BCC plus dopant) can be used. In some embodiments, the doping material can be iron in combination with another doping material. In some embodiments, iron is not used as the doping material. In some embodiments, nickel can be used as the doping material. Preferably, the BCC layer can be dense and essentially defect free.

The material of the ammonia synthesis catalyst layer can be ruthenium, iron, vanadium, palladium coated niobium, ruthenium coated palladium silver, titanium, zirconium, vanadium, niobium, hafnium, tantalum, chromium, molybdenum, tungsten, manganese, rhenium, technetium, alloys thereof, including by way of example vanadium-iron, and combinations thereof. The ammonia synthesis catalyst layer can disassociate nitrogen to atomic nitrogen in addition to forming ammonia. The ammonia synthesis catalyst layer can be porous. The total thickness of the ammonia synthesis catalyst layer can be between about 10 nm and about 500 microns. The ammonia synthesis catalyst layer can be a single layer of material, or can be multiple layers of material. Furthermore, multiple materials can be used in the ammonia synthesis catalyst layer. The ammonia synthesis catalyst layer can cover between about 1 to about 100% of the second catalyst layer. The ammonia synthesis catalyst layer can be any suitable shape. By way of example only, the ammonia synthesis catalyst layer can be dots, squares, ovals, stars, diamonds, ovals, irregularly shaped, or any full cover the second catalyst layer.

The membrane can further comprise a porous layer. The material of the porous layer can be alumina, silica, zirconia, ceria, titania and the like. Layers can be built to form the structure. By way of example only, ruthenium could be added to the porous material to prepare the ammonia synthesis catalyst layer. The second catalyst can then be deposited or added to the ammonia synthesis catalyst layer. A BCC metal, and the first catalyst layer can then be added to form the membrane. One skilled in the art would understand that you can alter the configuration of the membrane and its constituents without deviating from the invention.

The membrane can be any suitable shape or geometric configuration, including but not limited to tubular, planar, semi-tubular, oval, square, triangular, pyramid, non-planar, hollow fibers, or other shapes suitable for use in a particular process.

The ammonia synthesis catalyst layer can further include an ammonia promoter. Ammonia promoters can increase the ammonia synthesis rate. The ammonia promoter can include an alkali metal, including but not limited to potassium, cesium, or barium, or other similar materials. The ammonia promoter can be introduced using any suitable method, including impregnation of the material. For example, if the ammonia synthesis catalyst material is ruthenium, the promoter can be introduced by aqueous nitrate solutions of the alkali metal, including $CsNO_3$ or $BaNO_3$. The resulting molar ratios of the alkali metal to the material of the ammonia synthesis catalyst layer can be between about 1:1 and about 0.6:1.

An aspect of the invention is a method of using an ammonia forming membrane. The method includes providing hydrogen to a hydrogen separation side of the membrane to produce atomic hydrogen and providing nitrogen to an ammonia synthesis catalyst layer to produce atomic nitrogen and combining the atomic hydrogen and atomic nitrogen to produce ammonia.

The hydrogen separation side comprises at least a first catalyst layer. In some embodiments, the hydrogen separation side comprises the first catalyst layer, a BCC metal. In some embodiments, the hydrogen separation side comprises the first catalyst layer, a BCC metal and a second catalyst layer.

In certain embodiments of the present invention, the first catalyst layer and the second catalyst layer can be the same material. In some embodiments, the first layer and the second layer can be different materials. The materials for the first or second catalyst layer can be a platinum group metal, a platinum group alloy, a metal carbide, a metal sulfide, a metal nitride, a Group V metal, Group V metal alloy, a Group VI metal, a Group VI metal alloy, a Group VIII metal, a Group VIII metal alloy, and combinations thereof. By way of example only, the metal can be palladium, platinum, nickel, cobalt, ruthenium, iron, rhodium, manganese, chromium, molybdenum, tungsten, rhenium, tantalum, niobium, vanadium, zirconium, gold, copper, silver, alloys thereof, and the like. In some embodiments, the metal carbide can be chosen based on the operating temperature of the membrane. For example, if a higher temperature is desired in use, then the catalyst layer can be a metal carbide, such as molybdenum carbide. In some embodiments, a single first catalyst layer or second catalyst layer can be used. The thickness of a single first or second catalyst layer can be between about 2 nm and about 100 micrometers, in some embodiments about 5 to 100 nm. In some embodiments, multiple layers of the first catalyst layer or second catalyst layer can be used. The total thickness of the first catalyst layer and the second catalyst layer can be between about 2 nm and about 100 micrometers. In some embodiments, the layers of the first catalyst layer or the second catalyst layer can be made of the same material or can be different materials. The first or second catalyst layers can cover the entire first side or second side, respectively, of the BCC metal diffusion layer. In some embodiments, the first catalyst layer can cover between about 10% to about 100% of the BCC metal diffusion layer. In some embodiments, the second catalyst layer can cover between about 10% to about 100% of the BCC metal diffusion layer. The first catalyst layer or second catalyst layer can be any suitable shape. By way of example only, the first or second catalyst layer can be dots, squares, ovals, stars, diamonds, ovals, irregularly shaped, or any full cover the BCC metal diffusion layer.

The first catalyst layer and the second catalyst layer can react with a substantial amount of the hydrogen provided to it, up to approximately 80%. The first and second catalyst layers of the present invention can be 100 times more permeable compared to proton conductor materials of the prior art, and should therefore be able to produce higher rates of hydrogen. A higher permeability can optimize the catalyst as the ammonia forming reaction will no longer be limited on how quickly protons can be supplied to atomic nitrogen to form ammonia. Furthermore, the first and second catalyst layers, along with the BCC metal diffusion layer, can be used to fine tune the hydrogen flux.

The BCC metal diffusion layer can be any suitable material, including Group V metals, or their alloys. The materials of the BCC metal diffusion layer are advantageous because, while hydrogen permeates the material, the materials do not dissociate hydrogen as easily as the materials of the first or second catalyst layers. The invention can take advantage of the permeation rate of hydrogen through the BCC metal diffusion layer to provide atomic hydrogen to the atomic nitrogen in a controlled manner. By way of non-limiting example, the material of the BCC metal diffusion layer can be vanadium, niobium, tantalum and alloys thereof. The thickness of the BCC metal diffusion layer can be between about 1 micron and about 1 mm. In some embodiments, the BCC metal diffusion layer can be doped with a doping material. The doping material can stabilize the BCC metal diffusion layer, often by reducing the hydrogen solubility, and is especially useful at lower temperature, below about 400° C. to prevent hydrogen embrittlement. The doping material can comprise iron, nickel, chromium, cobalt, molybdenum, tungsten, alloys thereof, and combinations thereof. Between about 1 wt. % and about 20 wt. % of the dopant to the total weight of the BCC metal diffusion layer material (BCC plus dopant) can be used. In some embodiments, the doping material can be iron in combination with another doping material. In some embodiments, iron is not used as the doping material. In some embodiments, nickel can be used as the doping material. Preferably, the BCC layer can be dense and essentially defect free.

The material of the ammonia synthesis catalyst layer can be ruthenium, iron, vanadium, palladium coated niobium, ruthenium coated palladium silver, titanium, zirconium, vanadium, niobium, hafnium, tantalum, chromium, molybdenum, tungsten, manganese, rhenium, technetium, alloys thereof, including by way of example vanadium-iron, and combinations thereof. The ammonia synthesis catalyst layer can disassociate nitrogen to atomic nitrogen in addition to forming ammonia. The ammonia synthesis catalyst layer can be porous. The total thickness of the ammonia synthesis catalyst layer can be between about 10 nm and about 500 microns. The ammonia synthesis catalyst layer can be a single layer of material, or can be multiple layers of material. Furthermore, multiple materials can be used in the ammonia synthesis catalyst layer. The ammonia synthesis catalyst layer can cover between about 1 to about 100% of the second catalyst layer. The ammonia synthesis catalyst layer can be any suitable shape. By way of example only, the ammonia synthesis catalyst layer can be dots, squares, ovals, stars, diamonds, ovals, irregularly shaped, or any full cover the second catalyst layer.

The membrane can further comprise a porous layer. The material of the porous layer can be alumina, silica, zirconia, ceria, titania and the like. Layers can be built to form the structure. By way of example only, ruthenium could be added to the porous material to prepare the ammonia synthesis catalyst layer. The second catalyst can then be deposited or added to the ammonia synthesis catalyst layer. A BCC metal, and the first catalyst layer can then be added to form the membrane. One skilled in the art would understand that you can alter the configuration of the membrane and its constituents without deviating from the invention.

The membrane can be any suitable shape or geometric configuration, including but not limited to tubular, planar, semi-tubular, oval, square, triangular, pyramid, non-planar, hollow fibers, or other shapes suitable for use in a particular process.

The ammonia synthesis catalyst layer can further include an ammonia promoter. Ammonia promoters can increase the ammonia synthesis rate. The ammonia promoter can include an alkali metal, including but not limited to potassium, cesium, or barium, or other similar materials. The ammonia promoter can be introduced using any suitable method, including impregnation of the material. For example, if the ammonia synthesis catalyst material is ruthenium, the promoter can be introduced by aqueous nitrate solutions of the alkali metal, including $CsNO_3$ or $BaNO_3$. The resulting molar ratios of the alkali metal to the material of the ammonia synthesis catalyst layer can be between about 1:1 and about 0.6:1.

An aspect of the invention is a method of using a doped membrane. The membrane includes a doped BCC metal diffusion layer, a catalyst layer, and an ammonia synthesis catalyst layer. Hydrogen is separated to produce atomic hydrogen on the hydrogen separation side of the membrane. The hydrogen separation side of the membrane is opposite the side of the membrane with the ammonia synthesis catalyst layer. Nitrogen is provided to the ammonia synthesis catalyst layer of the membrane to produce atomic nitrogen. The atomic hydrogen and the atomic nitrogen are combined to form ammonia.

The hydrogen separation side comprises at least the catalyst layer and the doped BCC metal. In some embodiments, a second catalyst layer can be used. Thus, in some embodiments, the hydrogen separation side comprises the first catalyst layer, a BCC metal and a second catalyst layer.

In certain embodiments of the present invention, the first catalyst layer and the second catalyst layer can be the same material. In some embodiments, the first layer and the second layer can be different materials. The materials for the first or second catalyst layer can be a platinum group metal, a platinum group alloy, a metal carbide, a metal sulfide, a metal nitride, a Group V metal, Group V metal alloy, a Group VI metal, a Group VI metal alloy, a Group VIII metal, a Group VIII metal alloy, and combinations thereof. By way of example only, the metal can be palladium, platinum, nickel, cobalt, ruthenium, iron, rhodium, manganese, chromium, molybdenum, tungsten, rhenium, tantalum, niobium, vanadium, zirconium, gold, copper, silver, alloys thereof, and the like. In some embodiments, the metal carbide can be chosen based on the operating temperature of the membrane. For example, if a higher temperature is desired in use, then the catalyst layer can be a metal carbide, such as molybdenum carbide. In some embodiments, a single first catalyst layer or second catalyst layer can be used. The thickness of a single first or second catalyst layer can be between about 2 nm and about 100 micrometers, in some embodiments about 5 to 100 nm. In some embodiments, multiple layers of the first catalyst layer or second catalyst layer can be used. The total thickness of the first catalyst layer and the second catalyst layer can be between about 2 nm and about 100 micrometers. In some embodiments, the layers of the first catalyst layer or the second catalyst layer can be made of the same material or can be different materials. The first or second catalyst layers can cover the entire first side or second side, respectively, of the BCC metal diffusion layer. In some embodiments, the first catalyst layer can cover between about 10% to about 100% of the BCC metal diffusion layer. In some embodiments, the second catalyst layer can cover between about 10% to about 100% of the BCC metal diffusion layer. The first catalyst layer or second catalyst layer can be any suitable shape. By way of example only, the first or second catalyst layer can be dots, squares, ovals, stars, diamonds, ovals, irregularly shaped, or any full cover the BCC metal diffusion layer.

The first catalyst layer and the second catalyst layer can react with a substantial amount of the hydrogen provided to it, up to approximately 80%. The first and second catalyst layers of the present invention can be 100 times more permeable compared to proton conductor materials of the prior art, and should therefore be able to produce higher rates of hydrogen. A higher permeability can optimize the catalyst as the ammonia forming reaction will no longer be limited on how quickly protons can be supplied to atomic nitrogen to form ammonia. Furthermore, the first and second catalyst layers, along with the BCC metal diffusion layer, can be used to fine tune the hydrogen flux.

The BCC metal diffusion layer can be any suitable material, including Group V metals, or their alloys. The materials of the BCC metal diffusion layer are advantageous because, while hydrogen permeates the material, the materials do not dissociate hydrogen as easily as the materials of the first or second catalyst layers. The invention can take advantage of the permeation rate of hydrogen through the BCC metal diffusion layer to provide atomic hydrogen to the atomic nitrogen in a controlled manner. By way of non-limiting example, the material of the BCC metal diffusion layer can be vanadium, niobium, tantalum and alloys thereof. The thickness of the BCC metal diffusion layer can be between about 1 micron and about 1 mm. In some embodiments, the BCC metal diffusion layer can be doped with a doping material. The doping material can stabilize the BCC metal diffusion layer, often by reducing the hydrogen solubility, and is especially useful at lower temperature, below about 400° C. to prevent hydrogen embrittlement. The doping material can comprise iron, nickel, chromium, cobalt, molybdenum, tungsten, alloys thereof, and combinations thereof. Between about 1 wt. % and about 20 wt. % of the dopant to the total weight of the BCC metal diffusion layer material (BCC plus dopant) can be used. In some embodiments, the doping material can be iron in combination with another doping material. In some embodiments, iron is not used as the doping material. In some embodiments, nickel can be used as the doping material. Preferably, the BCC layer can be dense and essentially defect free.

The material of the ammonia synthesis catalyst layer can be ruthenium, iron, vanadium, palladium coated niobium, ruthenium coated palladium silver, titanium, zirconium, vanadium, niobium, hafnium, tantalum, chromium, molybdenum, tungsten, manganese, rhenium, technetium, alloys thereof, including by way of example vanadium-iron, and combinations thereof. The ammonia synthesis catalyst layer can disassociate nitrogen to atomic nitrogen in addition to forming ammonia. The ammonia synthesis catalyst layer can be porous. The total thickness of the ammonia synthesis catalyst layer can be between about 10 nm and about 500 microns. The ammonia synthesis catalyst layer can be a single layer of material, or can be multiple layers of material.

Furthermore, multiple materials can be used in the ammonia synthesis catalyst layer. The ammonia synthesis catalyst layer can cover between about 1 to about 100% of the second catalyst layer. The ammonia synthesis catalyst layer can be any suitable shape. By way of example only, the ammonia synthesis catalyst layer can be dots, squares, ovals, stars, diamonds, ovals, irregularly shaped, or any full cover the second catalyst layer.

The membrane can further comprise a porous layer. The material of the porous layer can be alumina, silica, zirconia, ceria, titania and the like. Layers can be built to form the structure. By way of example only, ruthenium could be added to the porous material to prepare the ammonia synthesis catalyst layer. The second catalyst can then be deposited or added to the ammonia synthesis catalyst layer. A BCC metal, and the first catalyst layer can then be added to form the membrane. One skilled in the art would understand that you can alter the configuration of the membrane and its constituents without deviating from the invention.

The membrane can be any suitable shape or geometric configuration, including but not limited to tubular, planar, semi-tubular, oval, square, triangular, pyramid, non-planar, hollow fibers, or other shapes suitable for use in a particular process.

The ammonia synthesis catalyst layer can further include an ammonia promoter. Ammonia promoters can increase the ammonia synthesis rate. The ammonia promoter can include an alkali metal, including but not limited to potassium, cesium, or barium, or other similar materials. The ammonia promoter can be introduced using any suitable method, including impregnation of the material. For example, if the ammonia synthesis catalyst material is ruthenium, the promoter can be introduced by aqueous nitrate solutions of the alkali metal, including $CsNO_3$ or $BaNO_3$. The resulting molar ratios of the alkali metal to the material of the ammonia synthesis catalyst layer can be between about 1:1 and about 0.6:1.

The ammonia can be further processed into a final product. Final products can include, for example, ammonium, fertilizer, plastics, cleaning solutions, or the like. One skilled in the art would understand how to process the ammonia to form a final product.

An advantage of the present invention is that it utilizes the chemical potential of atomic hydrogen as a reagent. In metal membranes, $H_2$ is dissociated into its atomic form as illustrated in FIG. 1, which illustrates the mechanism of $H_2$ transport through a catalyst layer (illustrated as $Mo_2C$), BCC metal diffusion layer (illustrated as vanadium). At 1, there is external mass transfer. At 2, there is dissociative adsorption of the hydrogen. Item 3 illustrates transport through the catalyst layer, in this example, molybdenum carbide. Item 4 illustrates transport through the BCC layer, in this example, vanadium. Transport through an additional layer of the catalyst is illustrated in step 5, which is illustrated as the same material as the catalyst in step 3. Hydrogen is recombined and desorbed at step 6, and there is external mass transfer of hydrogen gas at step 7. The membrane is exposed to high pressure on the side of step 1, where it is at low pressure at step 7. Suitable thicknesses of the layers is also illustrated in FIG. 1.

Figure 2:
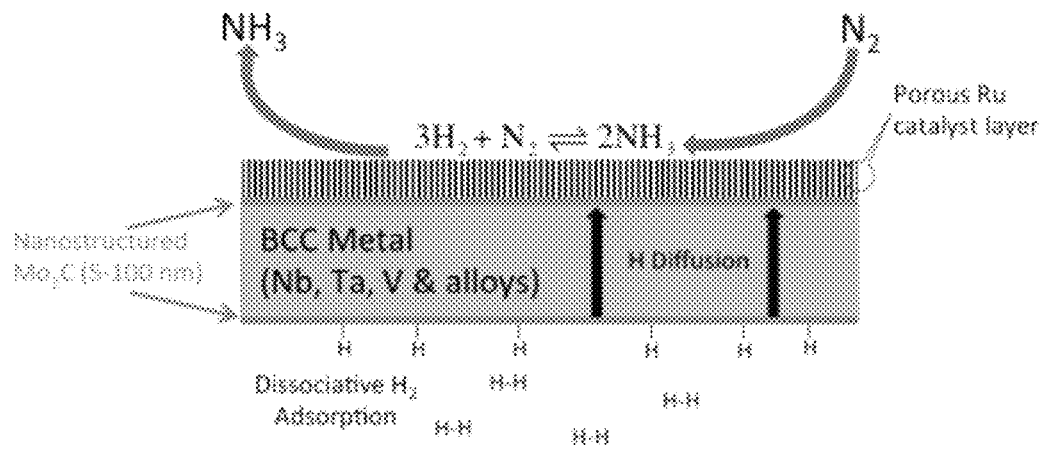
FIG. 2 illustrates a first catalyst layer adjacent to a BCC metal, a second catalyst layer, and an ammonia synthesis catalyst layer.

One embodiment of the present invention is illustrated in FIG. 2. FIG. 2 illustrates a first catalyst layer (illustrated as $Mo_2C$), adjacent to a BCC metal, in this illustrations (niobium, vanadium, tantalum, or alloys thereof), a second catalyst layer (illustrated as $Mo_2C$) and an ammonia synthesis catalyst layer (illustrated as porous ruthenium). Hydrogen disassociates on the first catalyst, diffused through the BCC metal, is present on the second catalyst (though not illustrated) as atomic hydrogen, where it joins with atomic nitrogen, which disassociated on the ruthenium catalyst layer, to form ammonia.

Figure 3:
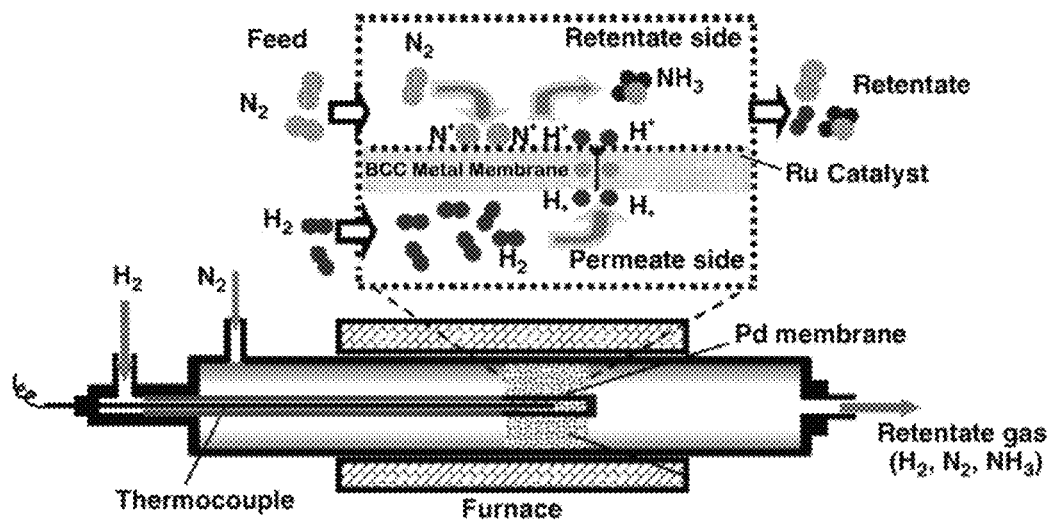
FIG. 3 illustrates the ammonia forming membrane and a method of using the membrane to form ammonia (modified from Zhang et al., High-purity $Co_x$-free $H_2$ generation from $NH_3$ via the ultra permeable and highly selective Pd membranes, J Membr Sci 277:85-93 (2006))

FIG. 3 illustrates the membrane and a method of using the membrane to form ammonia. Hydrogen and nitrogen feeds are independent of each other and only combined after the hydrogen has permeated through the membrane. In this illustration, the membrane reactor for $NH_3$ synthesis combines the $Mo_2C$/BCC metal membrane with a porous ruthenium co-catalyst layer on the $NH_3$ synthesis side. The chemisorption of nitrogen is significantly slower than hydrogen due to its stronger triple bond, and to overcome this imbalance we propose to use a porous ruthenium layer. Atomic hydrogen permeates through the BCC metal membrane, followed by surface diffusion recombination with atomic nitrogen to form $NH_3$ on the porous ruthenium surface. The flux of atomic hydrogen and atomic nitrogen may be independently controlled to maximize ammonia production.

Figure 4:
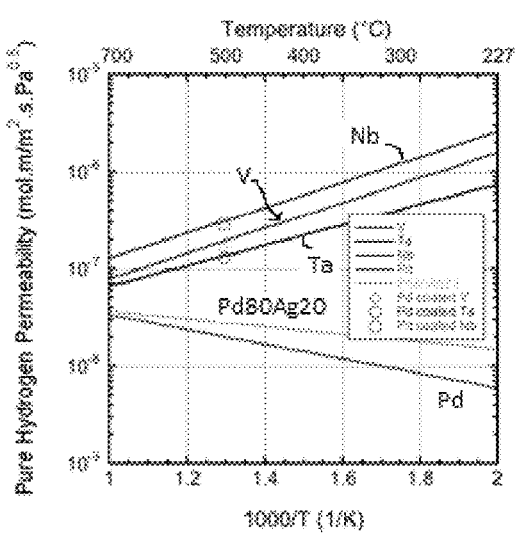
FIG. 4 depicts the calculated permeability of BCC metals compared to Pd and $Pd_{80}Ag_{20}$ (from Steward, Review of Hydrogen Isotope Permeability Through Materials, Lawrence Livermore National Lab., (Aug. 15, 1983) ("Steward"))

FIG. 4 depicts the calculated permeability of BCC metals compared to Pd and $Pd_{80}Ag_{20}$ (from Steward, 1983) and open symbols are experimental data from Cooney et al., A comparison of the performance and stability of Pd/BCC metal composite membranes for hydrogen purification, Int'l J. of Hydrogen Energy, 19009-19017 (2014). As depicted in FIG. 4, the hydrogen permeability of BCC metals can be orders of magnitude greater than palladium or the palladium-silver alloy due to their more open lattice structure compared to face centered cubic metals like palladium. The economic driver is that these BCC metals are 1-2 orders of magnitude less expensive than palladium. The high hydrogen permeability and low cost of these BCC metals enables the use of cold rolled foils that are mechanical robust and provide infinite selectivity.

Figure 5:
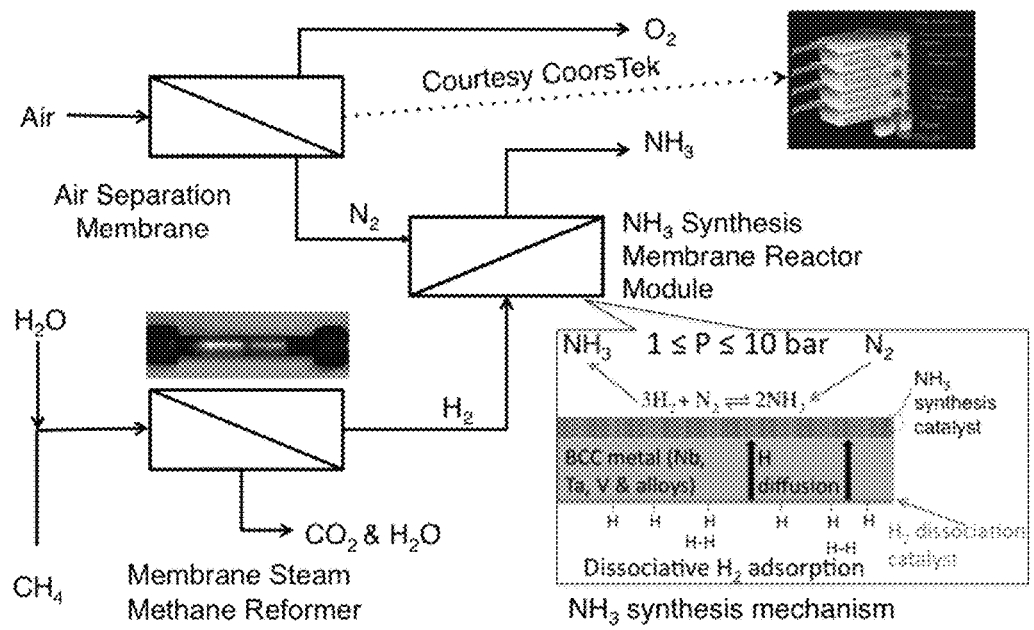
FIG. 5 illustrates a method to use the ammonia forming membranes of the present invention.

FIG. 5 illustrates a method to use the membranes of the present invention. More specifically, the method uses methane and water as the starting material to form hydrogen, and air as the starting material to form nitrogen. The method includes providing water and methane to a device, illustrated as a membrane steam methane reformer, to produce byproducts, carbon dioxide and water, and a hydrogen gas stream. Air is provided to an air separation membrane to produce byproduct oxygen gas and nitrogen gas. The membrane illustrated in FIG. 5 includes an ammonia synthesis layer, the BCC metal layer and the catalyst (for dissociation of hydrogen). Hydrogen gas is supplied to the catalyst, while nitrogen is supplied to the ammonia synthesis layer. Ammonia is produced in the ammonia synthesis membrane reactor module illustrated in FIG. 5.

EXAMPLES

Experiment 1

Figure 6:
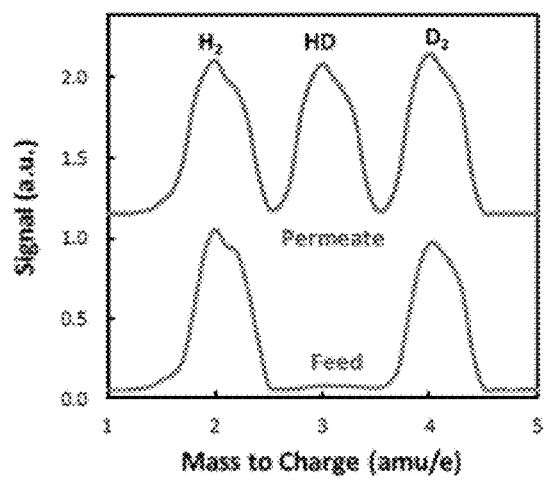
FIG. 6 illustrates the quadrupole mass spectrometry analysis of an $H_2/D_2$ mixture supplied in the feed and the resulting permeate stream, illustrating that complete isotopic scrambling occurs in the BCC membranes.

To prove the dissociation of hydrogen into its atomic form, a mass spectrometer was used to measure the feed and permeate when a BCC membrane is supplied with an $H_2/D_2$. FIG. 6 illustrates the quadrupole mass spectrometry analysis of an $H_2/D_2$ mixture supplied in the feed and the resulting permeate stream, illustrating that complete isotopic scrambling occurs in the BCC membranes. As illustrated in FIG. 6, complete isotopic scrambling is observed, confirming its dissociation and recombination. Most applications of $H_2$-permeable membrane reactors have focused on the removal of $H_2$ to drive conversion and overcome equilibrium constraints. Dissociation of $H_2$ provides approximately 100 kcal/mol of free energy which is simply lost to heat upon $H_2$ recombination. The present invention includes a potential to employ this chemical potential to accelerate ammonia synthesis.

To quantify the reaction, the composition of the sweep gas can be monitored in real time using a differentially pumped mass spectrometer (similar to a system used to verify the isotopic scrambling illustrated in FIG. 6). Ammonia synthesis can occur using the invention at temperatures ranging from about 300° C. to about 600° C., with pressures up to 2 MPa. Independent control of the $N_2$ pressure and the $H_2$ flux into the reaction zone is essential because the reaction rate of $NH_3$ on, for example, a ruthenium catalyst has negative reaction order on the $H_2$ partial pressure due to competitive adsorption of $H_2$ over $N_2$ on ruthenium.

Experiment 2

Figure 7:
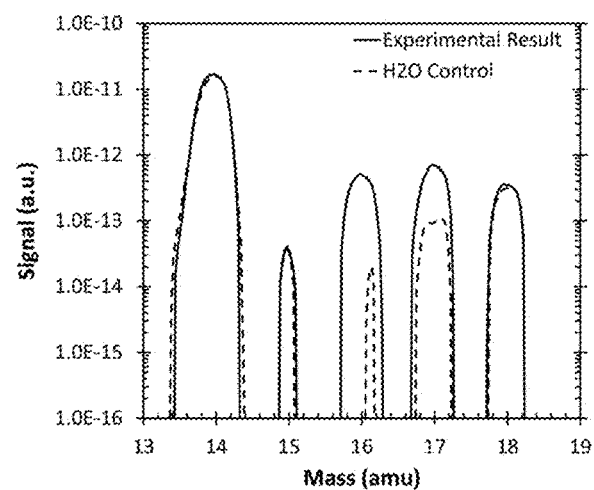
FIG. 7 depicts a mass spectrum showing ammonia in the sample.
Figure 8:
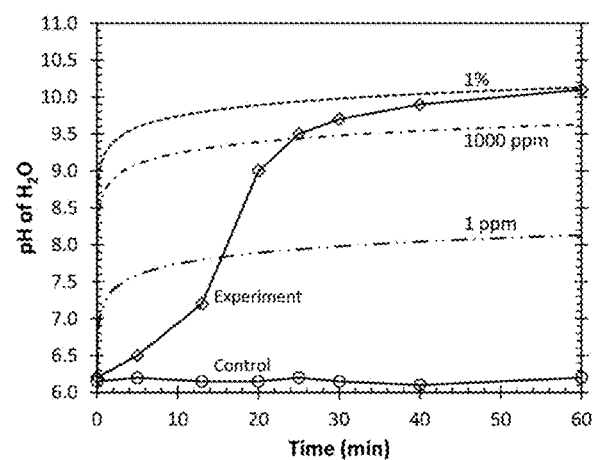
FIG. 8 depicts the stability of $H_2$ flux through palladium coated niobium membranes over a 48 hour time period.

An experiment was performed to demonstrate quantitative synthesis of $NH_3$ at atmospheric pressure (about 0.8 bar) and 500° C. using the membrane reactor approach illustrated in FIG. 2. The metallic, $H_2$ permeable membrane was a 100 micron thick niobium foil coated with a 100 nm palladium catalyst layer on the feed side and a sputtered ruthenium layer on the permeate, or $NH_3$ synthesis side. The $NH_3$ synthesis rate was about $6 \cdot 10^{-5}$ mol/m$^2 \cdot$s, higher than all of the rates reported for proton conducting membranes at 500° C. (see Amar et al., Solid-state electrochemical synthesis of ammonia: a review, J Solid State Electrochem 15:1845-60 (2014)). The thickness of the porous ruthenium catalyst layer was very thin, <10 nm. A Swagelok® VCR fitting permeation cell was used with an area of 1.2 cm$^2$. The mass spectrum illustrated in FIG. 7 clearly shows the presence of the $NH_3$ peaks (mass numbers 16 and 17). The $NH_3$ composition was calculated from the 17 amu peak after subtracting the contribution from the water cracking fraction in a control measurement with an $N_2/H_2O$ feed stream. No measurable $NH_3$ was seen for a control Pd/Nb membrane without the ruthenium catalyst layer at identical test conditions. In addition to the mass spectrometer data illustrating the synthesis of $NH_3$, the reactor product gas was bubbled through de-ionized water and the pH increased from 6 to 10 over the one hour test period as illustrated in FIG. 8. The dotted line refers to the calculated pH change curves for different concentrations of $NH_3$ in the product gas. The control sample was de-ionized water. The pH increase could only be due to the presence of $NH_3$ in the gas stream. The $NH_3$ synthesis rate was calculated from the $NH_3$ concentration measured by the mass spectrometer, and is lower, and more conservative than the synthesis rate determined from the pH change. The Pd/Nb membrane was chosen for its high permeability and ease of fabrication for the proof of concept experiments.

FIG. 8 illustrates the stability of $H_2$ flux through palladium coated niobium membranes over an about 48 hour period. As illustrated in FIG. 8, the high permeability of the Pd coated Nb membrane is relatively stable for 48 hours and is consistent with the theoretical predictions in FIG. 4.

Experiment 3—Comparison of Hydrogen Permeability

Figure 9:
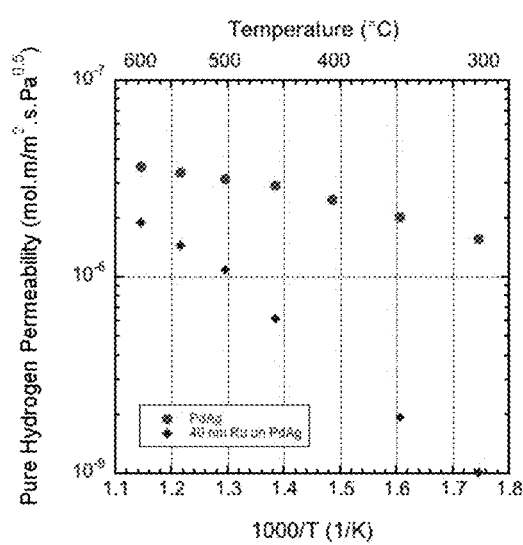
FIG. 9 illustrates the comparison of hydrogen permeability of a 25 micron thick $Pd_{75}Ag_{25}$ foil with and without a 40 nm hick porous ruthenium coating.

The thickness and structure of the sputter deposited ruthenium catalyst layer can be varied by changing the deposition time, substrate temperature and argon pressure. A porous ruthenium coatings on PdAg foil membranes with thicknesses up to 40 nm was created by sputtering at ambient temperature. As illustrated in FIG. 9, the $H_2$ flux for a ruthenium sputtered PdAg foil decreased as expected compared to the foil without the ruthenium layer. Ruthenium nanoparticle catalysts can also be synthesized on Pd/Nb membranes using a CVD process with a $Ru(CO)_{12}$ precursor. Given the very low $H_2$ solubility of ruthenium (similar to platinum), if the ruthenium layer was dense, the $H_2$ flux of the Ru/PdAg foil would have been reduced to close to zero. Ruthenium catalyst layers with thicknesses up to 100 nm can be fabricated by sputtering. As the surface area of the $NH_3$ synthesis catalyst increases, higher synthesis rates could be observed by increasing the $N_2$ pressure and/or the H atom flux. The surface area of the ruthenium catalysts can be measured using $H_2$ chemisorption using an existing Micromeritics ASAP 2020 instrument, or similar instrumentation.

Ranges have been discussed and used within the forgoing description. One skilled in the art would understand that any sub-range within the stated range would be suitable, as would any number within the broad range, without deviating from the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. An ammonia forming membrane, comprising
   at least one first catalyst layer;
   a BCC metal diffusion layer comprising a first side and a second side, wherein the first catalyst layer is connected to the first side of the BCC metal diffusion layer, wherein the BCC metal diffusion layer comprises a doping material selected from the group consisting of iron, nickel, chromium, cobalt, molybdenum, tungsten, alloys thereof, and combinations thereof;
   at least one second catalyst layer comprising a first side and a second side, wherein the first side of the second catalyst layer is connected to the second side of the BCC metal diffusion layer; and
   an ammonia synthesis catalyst layer, wherein the ammonia synthesis catalyst layer is connected to a second side of the second catalyst layer, and wherein the ammonia synthesis catalyst layer is porous.

2. The membrane of claim 1, wherein a material of the first layer and the second layer are the same.

3. The membrane of claim 1, wherein a material of the first layer is selected from the group consisting of platinum group metal, a platinum group alloy, a metal carbide, a metal sulfide, a metal nitride, Group V metals, Group V metal alloys, and combinations thereof.

4. The membrane of claim 1, wherein a thickness of the at least one first layer is between about 2 to about 50 nm thick.

5. The membrane of claim 1, wherein a total thickness of the at least first layer is between about 2 and about 50 nm thick.

6. The membrane of claim 1, wherein the second catalyst layer covers between about 10% to about 100% of the BCC metal diffusion layer.

7. The membrane of claim 1, wherein a material of the BCC metal diffusion layer comprises a Group III metal, a Group IV metal, a Group V metal or a Group VI metal.

8. The membrane of claim 1, wherein the BCC metal diffusion layer comprises a material selected from the group consisting of vanadium, niobium, tantalum, and alloys thereof.

9. The membrane of claim 1, wherein a thickness of the ammonia synthesis catalyst layer is between 10 nm and 500 microns.

10. The membrane of claim 1, wherein the doping material comprises between about 1 wt. % and about 20 wt. % of the BCC metal diffusion layer.

11. An ammonia forming membrane, comprising
at least one first catalyst layer;
a BCC metal diffusion layer comprising a first side and a second side, wherein the first catalyst layer is connected to the first side of the BCC metal diffusion layer;
at least one second catalyst layer comprising a first side and a second side, wherein the first side of the second catalyst layer is connected to the second side of the BCC metal diffusion layer; and
an ammonia synthesis catalyst layer, wherein the ammonia synthesis catalyst layer is connected to a second side of the second catalyst layer, and wherein the ammonia synthesis catalyst layer comprises a member selected from the group consisting of porous ruthenium, iron, vanadium-iron alloy, palladium coated niobium, ruthenium coated palladium silver, titanium, zirconium, vanadium, niobium, hafnium, tantalum, chromium, molybdenum, tungsten, manganese, rhenium, technetium, alloys thereof and combinations thereof.

12. The membrane of claim 11, wherein a material of the first layer is selected from the group consisting of platinum group metal, a platinum group alloy, a metal carbide, a metal sulfide, a metal nitride, Group V metals, Group V metal alloys, and combinations thereof.

13. The membrane of claim 11, wherein a thickness of the at least one first layer is between about 2 to about 50 nm thick, and wherein a thickness of the ammonia synthesis catalyst layer is between 10 nm and 500 microns.

14. The membrane of claim 11, wherein the second catalyst layer covers between about 10% to about 100% of the BCC metal diffusion layer.

15. The membrane of claim 11, wherein a material of the BCC metal diffusion layer comprises a Group III metal, a Group IV metal, a Group V metal or a Group VI metal.

16. The membrane of claim 11, wherein the BCC metal diffusion layer comprises a material selected from the group consisting of vanadium, niobium, tantalum, alloys thereof and combinations thereof.

17. The membrane of claim 11, wherein the BCC metal diffusion layer comprises a doping material selected from the group consisting of iron, nickel, chromium, cobalt, molybdenum, tungsten, alloys thereof, and combinations thereof.

18. The membrane of claim 17, wherein the doping material comprises between about 1 wt. % and about 20 wt. % of the BCC metal diffusion layer.

* * * * *